(12) United States Patent
Kim (10) Patent No.: US 12,345,945 B2
(45) Date of Patent: Jul. 1, 2025

(54) VARIABLE LENS DRIVER CIRCUIT, COMMUNICATION DEVICE COMPRISING SAME, AND METHOD FOR DRIVING VARIABLE LENS

(71) Applicant: LG INNOTEK CO., LTD., Seoul (KR)

(72) Inventor: Chang Wook Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 618 days.

(21) Appl. No.: 17/754,013

(22) PCT Filed: Sep. 17, 2020

(86) PCT No.: PCT/KR2020/012579
§ 371 (c)(1),
(2) Date: Mar. 21, 2022

(87) PCT Pub. No.: WO2021/054748
PCT Pub. Date: Mar. 25, 2021

(65) Prior Publication Data
US 2022/0334345 A1  Oct. 20, 2022

(30) Foreign Application Priority Data

Sep. 20, 2019  (KR) .......... 10-2019-0115892

(51) Int. Cl.
*G02B 7/04* (2021.01)
*G03B 3/10* (2021.01)
*H04N 23/57* (2023.01)

(52) U.S. Cl.
CPC ............. *G02B 7/04* (2013.01); *G03B 3/10* (2013.01); *H04N 23/57* (2023.01)

(58) Field of Classification Search
CPC ................. H02M 1/44; H02M 3/156
See application file for complete search history.

(56) References Cited

U.S. PATENT DOCUMENTS

| | | | | |
|---|---|---|---|---|
| 2009/0110384 A1* | 4/2009 | Lynch | ..... | H02M 7/48 396/133 |
| 2009/0276639 A1* | 11/2009 | Saha | ..... | H02M 3/156 713/300 |

(Continued)

FOREIGN PATENT DOCUMENTS

| KR | 10-0462520 B1 | 12/2004 |
|---|---|---|
| KR | 10-2018-0086737 A | 8/2018 |

(Continued)

OTHER PUBLICATIONS

International Search Report dated Dec. 30, 2020 in International Application No. PCT/KR2020/012579.

*Primary Examiner* — Noam Reisner
(74) *Attorney, Agent, or Firm* — SALIWANCHIK, LLOYD & EISENSCHENK (57) ABSTRACT

A variable lens driver circuit, according to an embodiment, comprises: a voltage booster which increases the level of supply voltage by carrying out a switching operation corresponding to a switching frequency; a noise detection unit which detects the extent of noise generated from the voltage booster by the switching operation; and a booster control unit which adjusts the size of the switching frequency of the voltage booster in response to the extent of the noise which has been detected.

19 Claims, 9 Drawing Sheets

(56) References Cited

U.S. PATENT DOCUMENTS

| | | | | |
|---|---|---|---|---|
| 2010/0141233 A1* | 6/2010 | Kwok | ................... | H04B 15/00 |
| | | | | 323/351 |
| 2013/0264961 A1* | 10/2013 | Chang | .................. | H04B 10/802 |
| | | | | 315/201 |
| 2013/0300417 A1* | 11/2013 | Malaney | ................ | G01R 33/28 |
| | | | | 324/314 |
| 2017/0222551 A1 | 8/2017 | Liu et al. | | |
| 2020/0319380 A1* | 10/2020 | Kaminski | ................ | G02B 3/14 |

FOREIGN PATENT DOCUMENTS

| | | | |
|---|---|---|---|
| KR | 10-2018-0114802 A | 10/2018 |
| KR | 10-2019-0074928 A | 6/2019 |
| WO | 2018/187591 A2 | 10/2018 |

* cited by examiner

VARIABLE LENS DRIVER CIRCUIT, COMMUNICATION DEVICE COMPRISING SAME, AND METHOD FOR DRIVING VARIABLE LENS

CROSS-REFERENCE TO RELATED APPLICATIONS

This application is the U.S. national stage application of International Patent Application No. PCT/KR2020/012579, filed Sep. 17, 2020, which claims the benefit under 35 U.S.C. § 119 of Korean Application No. 10-2019-0115892, filed Sep. 20, 2019, the disclosures of each of which are incorporated herein by reference in their entirety.

TECHNICAL FIELD

Embodiments relate to a variable lens driving circuit, a communication device including the same, and a method of driving a variable lens.

BACKGROUND ART

In general, a wireless communication device such as a smartphone may transmit/receive wireless signals, and may include a variable lens such as a liquid lens in order to capture images. In this case, when a liquid lens driving circuit generates a booster voltage by operating in a switching manner corresponding to a predetermined switching frequency in order to generate a driving voltage for driving the liquid lens, noise may be generated. The noise generated during the switching operation may deteriorate sensitivity to a wireless signal, and thus research with the goal of overcoming this problem is underway.

DISCLOSURE

Technical Problem

Embodiments provide a variable lens driving circuit capable of reducing or eliminating deterioration in sensitivity to a wireless signal, a communication device including the same, and a method of driving a variable lens.

The objects to be accomplished by the present disclosure are not limited to the above-mentioned objects, and other objects not mentioned herein will be clearly understood by those skilled in the art from the following description.

Technical Solution

A variable lens driving circuit according to an embodiment may include a voltage booster configured to perform a switching operation corresponding to a switching frequency to increase the magnitude of a supply voltage, a noise detector configured to detect the level of noise generated from the voltage booster by the switching operation, and a booster controller configured to adjust the switching frequency of the voltage booster in response to the detected level of noise.

For example, the booster controller may control the voltage booster in response to the detected level of noise to output a result obtained by increasing the magnitude of the supply voltage as a booster voltage.

For example, the level of noise may include the density of the generated noise.

For example, the booster controller may include a storage unit, configured to store a result of matching of detected levels of noise with switching frequencies, and a frequency determination unit, configured to determine a switching frequency matching a level of noise exceeding an allowable noise level, among the stored levels of noise, to be an avoidance frequency.

For example, the booster controller may include a current determination unit configured to determine the intensity of an allowable current flowing through the voltage booster in response to an extent of adjustment of the switching frequency.

For example, the booster controller may determine the intensity of the allowable current depending on a predetermined amount of time taken to generate the booster voltage.

For example, the voltage booster may include a switch configured to perform a switching operation at the switching frequency and having one end connected to a reference potential, an inductor connected to the supply voltage and to the opposite end of the switch and disposed therebetween, and a diode having an anode connected to the opposite end of the switch. The booster voltage may correspond to a voltage applied across a cathode of the diode and one end of the switch.

For example, the allowable current may be a current flowing through the inductor.

A wireless communication device according to another embodiment may include a variable lens driving circuit, a variable lens configured to be driven in response to a variable lens driving voltage generated in the variable lens driving circuit using the booster voltage, and a communication unit disposed adjacent to the variable lens driving circuit and configured to transmit and receive a wireless signal.

For example, the noise detector may sense the sensitivity to a wireless signal, and may detect the level of noise using a result of sensing.

A variable lens driving method according to still another embodiment may include performing a switching operation corresponding to a switching frequency to increase the magnitude of a supply voltage, detecting the level of noise generated by the switching operation, determining whether sensitivity to a wireless signal is outside of an allowable range using the detected level of noise, and adjusting the switching frequency when the sensitivity to a wireless signal is outside of the allowable range.

For example, the variable lens driving method may further include determining a result obtained by increasing the magnitude of the supply voltage to be a booster voltage when the sensitivity to a wireless signal is within the allowable range.

For example, the determining whether the sensitivity to a wireless signal is outside of the allowable range may include determining whether a difference between the center frequency of the noise frequency band of the generated noise and the switching frequency is greater than a first predetermined value.

For example, the determining whether the sensitivity to a wireless signal is outside of the allowable range may include determining whether the range within which the switching frequency band having the switching frequency as a center frequency and the noise frequency band of the generated noise overlap each other exceeds a second predetermined range.

For example, the intensity of an allowable current flowing through a voltage booster, which increases the magnitude of the supply voltage, may be determined depending on an extent of adjustment of the switching frequency.

For example, the variable lens driving method may include reducing the peak value of the allowable current when the switching frequency is increased and increasing the peak value of the allowable current when the switching frequency is reduced.

Advantageous Effects

According to a variable lens driving circuit, a communication device including the same, and a method of driving a variable lens according to embodiments, a switching frequency is varied in order to find an optimum switching frequency at which deterioration in the sensitivity to a wireless signal is minimized, and a switch of a voltage booster is switched at the found switching frequency, thereby minimizing deterioration in the sensitivity to a wireless signal due to noise generated by a switching operation of the switch of the voltage booster.

In addition, the time taken to generate a booster voltage may be constant even upon changes in the switching frequency.

The effects achievable through the present disclosure are not limited to the above-mentioned effects, and other effects not mentioned herein will be clearly understood by those skilled in the art from the following description.

BEST MODE

Hereinafter, exemplary embodiments of the present disclosure will be described in detail with reference to the accompanying drawings.

The examples, however, may be embodied in many different forms, and should not be construed as being limited to the embodiments set forth herein. Rather, within the spirit and scope of the present disclosure, one or more components may be selectively and operatively combined or substituted.

Unless otherwise defined, all terms used herein (including technical and scientific terms) have the same meanings as commonly understood by those skilled in the art. It will be further understood that terms, such as those defined in commonly used dictionaries, should be interpreted as having meanings consistent with their meanings in the context of the relevant art.

Terms used in the embodiments of the present disclosure are provided for description of the embodiments, and the present disclosure is not limited thereto. In the specification, singular forms in sentences include plural forms unless otherwise noted. The meaning of "at least one of A, B, or C (or one or more of A, B, and C)" may be one or more combinations among all possible combinations that can be obtained from A, B, and C.

Additionally, terms such as "first", "second", "A", "B", "(a)", "(b)", etc. may be used herein to describe the components of the embodiments of the present disclosure. These terms are only used to distinguish one element from another element, and the essence, order, or sequence of corresponding elements is not limited by these terms.

It should be noted that if it is described in the specification that one component is "connected", "coupled", or "joined" to another component, the former may be directly "connected", "coupled", or "joined" to the latter, or may be indirectly "connected", "coupled", or "joined" to the latter via another component interposed therebetween.

It will be understood that when an element is referred to as being "on" or "under" another element, it can be directly on/under the element, or one or more intervening elements may also be present. When an element is referred to as being "on" or "under," "under the element" as well as "on the element" can be included based on the element.

Hereinafter, a wireless communication device according to an embodiment will be described with reference to the accompanying drawings.

Figure 1:
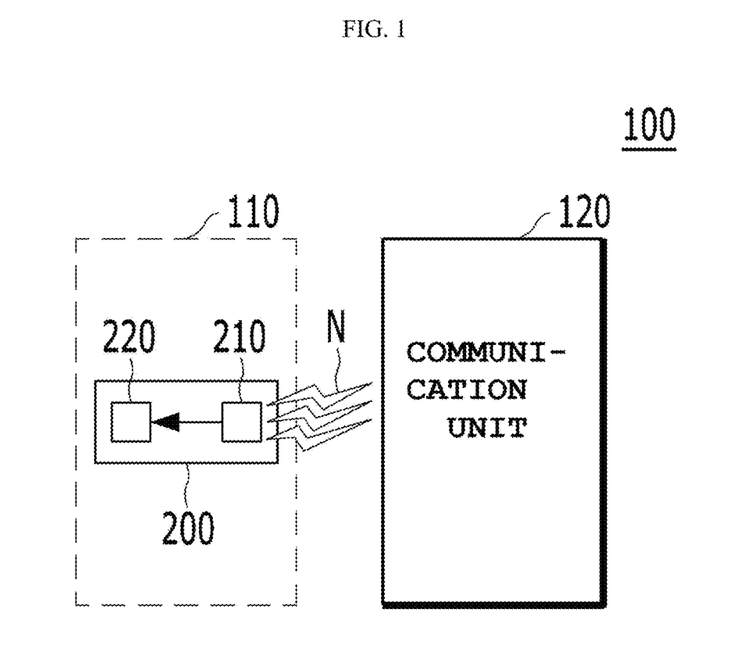
FIG. 1 is a block diagram of a wireless communication device according to an embodiment.

FIG. 1 is a block diagram of a wireless communication device 100 according to an embodiment, which may include an optical device 110 and a communication unit (or a communication module) 120. The wireless communication device 100 may be implemented as a portable device such as, for example, a smartphone, a laptop computer, and a tablet computer, but the embodiments are not limited to any specific type of wireless communication device 100.

The optical device 110 may process or analyze optical signals, and may include a camera module 200. The camera module 200 may include a variable lens driving circuit 210 and a variable lens 220.

The variable lens 220 may be a variable focus lens. Further, the variable lens 220 may be a lens that is adjustable in focus. The variable lens 220 may be at least one of a liquid lens, a polymer lens, a liquid crystal lens, or an SMA type. The liquid lens may include two liquids, specifically a conductive liquid and a non-conductive liquid, and may adjust the interface formed between the conductive liquid and the non-conductive liquid using a driving voltage applied to the liquid lens. The polymer lens may change the focus by controlling a polymer material using a driver such as a piezo actuator. The liquid crystal lens may change the focus by controlling a liquid crystal using electromagnetic force. The SMA type may change the focus by controlling a solid lens or a lens assembly including a solid lens using a shape memory alloy.

Hereinafter, for convenience of description, the variable lens 220 will be described as being a liquid lens. However, the following description of a variable lens driving device and method according to embodiments may also be applied to the case in which the variable lens 220 is a lens other than a liquid lens.

The variable lens driving circuit 210 generates a variable lens driving voltage for driving the variable lens 220 using a booster voltage, and outputs the generated variable lens driving voltage to the variable lens 220.

In general, the camera module 200 may include a lens assembly (not shown), a control circuit (not shown), and an image sensor (not shown). In this case, the lens assembly may include a plurality of lenses, the focal lengths of which are adjusted in response to driving voltages applied to a common terminal and a plurality of individual terminals, and the variable lens 220 may be included in the plurality of lenses. In addition, the control circuit may serve to supply a driving voltage to the variable lens 220, and the variable lens control circuit 210 may be included in the control circuit. The image sensor may be aligned with the lens assembly, and may serve to convert light transmitted through the lens assembly into an electrical signal.

As such, when the variable lens driving voltage is applied to the liquid lens, which is the variable lens 220, the interface between the conductive liquid and the non-conductive liquid is deformed, so the curvature and the focal length of the liquid lens 220 may be changed. The liquid lens 220, the lens assembly including the same, and the camera module 200 may perform an optical zoom function, an autofocusing function, and a hand tremor compensation function by controlling the deformation of the interface and the change in curvature.

In addition, the optical device 110 may further include a display unit (not shown) for outputting an image and a body housing in which the camera module 200 and the display unit are mounted. Examples of the optical device 110 may include camera/video devices, telescopic devices, microscopic devices, interferometers, photometers, polarimeters, spectrometers, reflectometers, auto-collimators, and lensmeters, but the embodiments are not limited to any specific type of optical device 110.

Meanwhile, the communication unit 120 may be disposed adjacent to the variable lens driving circuit 210, and may transmit/receive a wireless signal in order to communicate with other devices. Alternatively, unlike what is illustrated in FIG. 1, the communication unit 120 may be mounted in the form of a module in the body housing of the optical device 110.

Hereinafter, a variable lens driving circuit and a variable lens driving method according to embodiments will be described with reference to the accompanying drawings.

Figure 2:
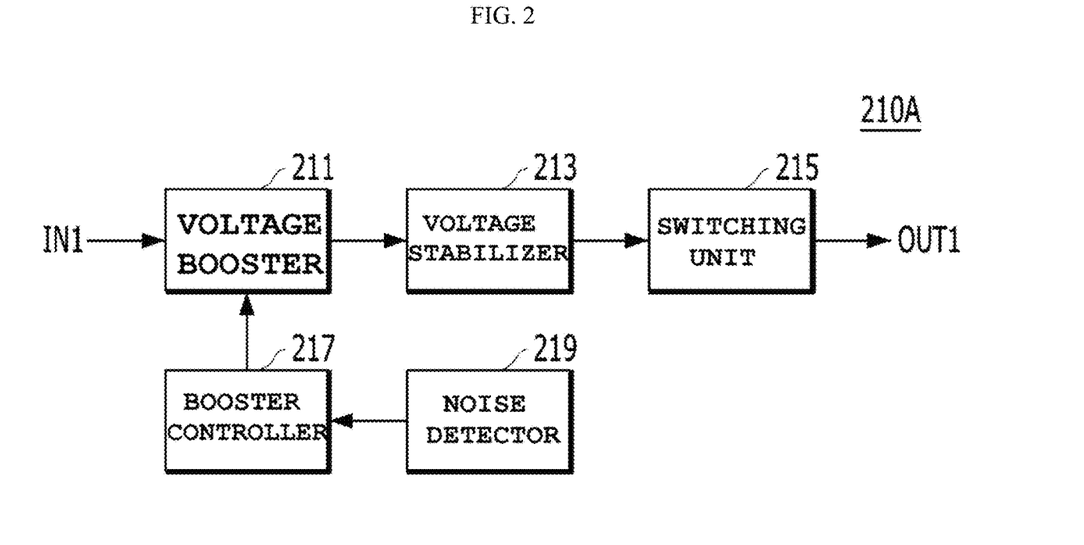
FIG. 2 is a block diagram of a variable lens driving device according to an embodiment.

FIG. 2 is a block diagram of a variable lens driving device 210A according to an embodiment, which may include a voltage booster 211, a booster controller 217, and a noise detector 219.

Figure 3:
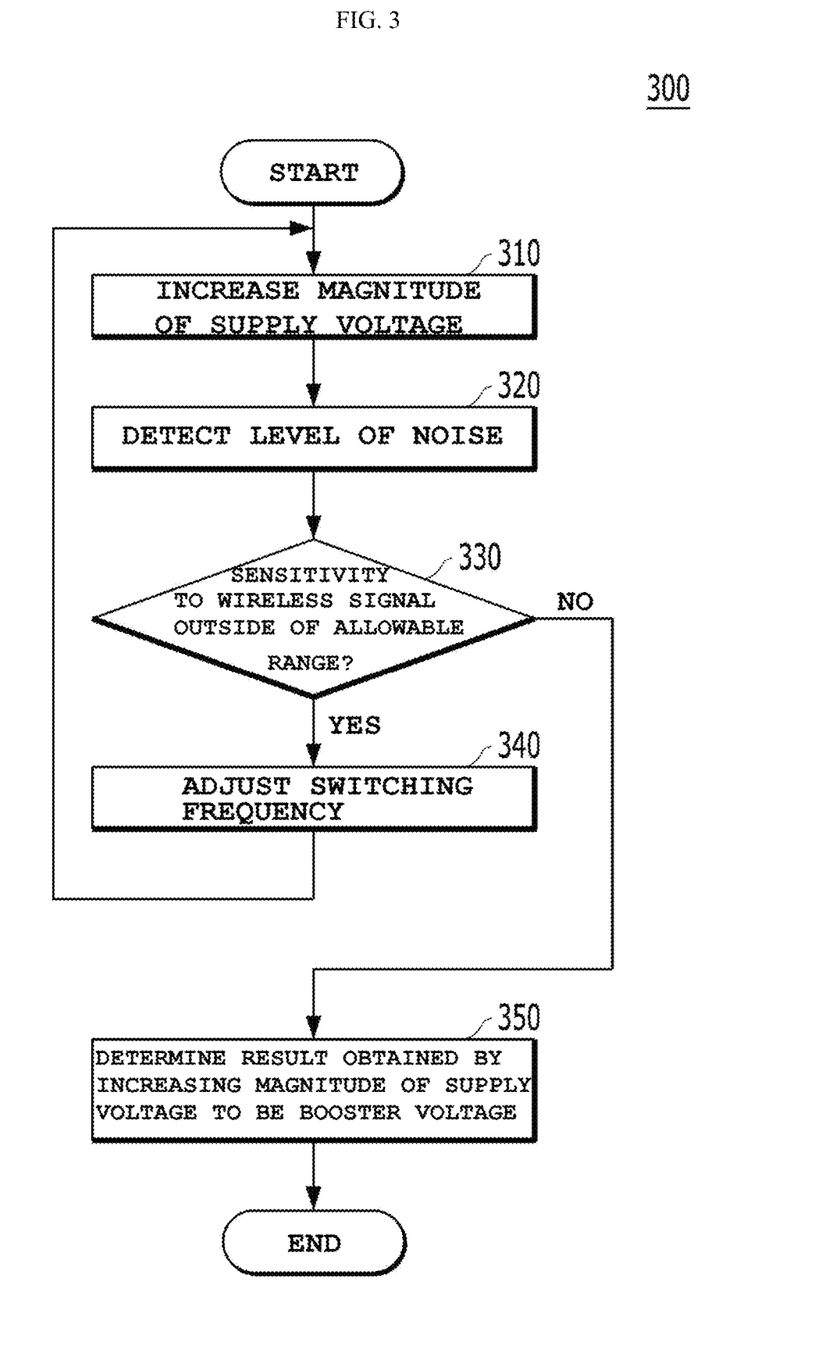
FIG. 3 is a flowchart for explaining a variable lens driving method according to an embodiment.

FIG. 3 is a flowchart for explaining a variable lens driving method 300 according to an embodiment.

The variable lens driving circuit 210A according to the embodiment shown in FIG. 2 may correspond to the variable lens driving circuit 210 shown in FIG. 1. That is, for better understanding of the present disclosure, the variable lens driving circuit 210A will be described as being included in the wireless communication device 100 having the configuration shown in FIG. 1, but the embodiments are not limited thereto. That is, the variable lens driving circuit 210A and the method 300 according to the embodiments may also be applied to a wireless communication device having a configuration different from that shown in FIG. 1.

In addition, the variable lens driving method 300 shown in FIG. 3 will be described as being performed by the variable lens driving device 210A shown in FIG. 2. However, the variable lens driving method 300 shown in FIG. 3 may be performed by a variable lens driving device configured differently from the variable lens driving device 210A shown in FIG. 2, and the variable lens driving device 210A shown in FIG. 2 may perform a method different from the variable lens driving method 300 shown in FIG. 3.

The voltage booster 211 performs a switching operation corresponding to a switching frequency to increase the magnitude of a supply voltage provided through an input terminal IN1 (step 310). For example, when the variable lens 220 is a liquid lens, the magnitude of a common voltage applied to a common electrode of the liquid lens may be fixed, and the magnitudes of individual voltages applied to individual electrodes of the liquid lens may be changed in response to the magnitude of the booster voltage output from the voltage booster 211. For example, the voltage booster 211 may receive a supply voltage having a low magnitude, e.g. 2.8 V, through the input terminal IN1, may boost the supply voltage, and may output a booster voltage having a high magnitude, e.g. 55 V to 75 V.

After step 310, the noise detector 219 detects the level of noise N generated from the voltage booster 211 by the switching operation, and outputs a result of detection to the booster controller 217 (step 320). Here, the detected noise is radiation noise, and may deteriorate the sensitivity of the communication unit 120 to a wireless signal.

For example, the noise detector 219 may sense the sensitivity to a wireless signal transmitted from or received by the communication unit 120, and may detect the level of noise using a result of sensing. In this case, the wireless signal sensed by the noise detector 219 may be a wireless signal received by the communication unit 120.

In addition, the level of noise detected by the noise detector 219 may include the density of noise.

After step 320, a determination is made as to whether the sensitivity to a wireless signal is outside of an allowable range based on the detected level of noise (step 330). Here, the allowable range may be a sensitivity range having a minimum level that must be maintained for communication with other devices, even if the sensitivity to a wireless signal is deteriorated by noise.

If the sensitivity to a wireless signal is outside of the allowable range, the switching frequency is adjusted, and the process proceeds to step 310 (step 340). Thereafter, the voltage booster 211 again performs a switching operation corresponding to the adjusted switching frequency to increase the magnitude of the supply voltage.

Steps 330 and 340 described above may be performed by the booster controller 217 shown in FIG. 2.

Specifically, the booster controller 217 may adjust the switching frequency of the voltage booster 211 in consideration of the level of noise detected by the noise detector 219. That is, the booster controller 217 may check whether the sensitivity to a wireless signal is outside of the allowable range based on the level of noise detected by the noise detector 219 (step 330).

The booster controller 217 may check whether the sensitivity to a wireless signal is outside of the allowable range in various ways.

Figure 4A:
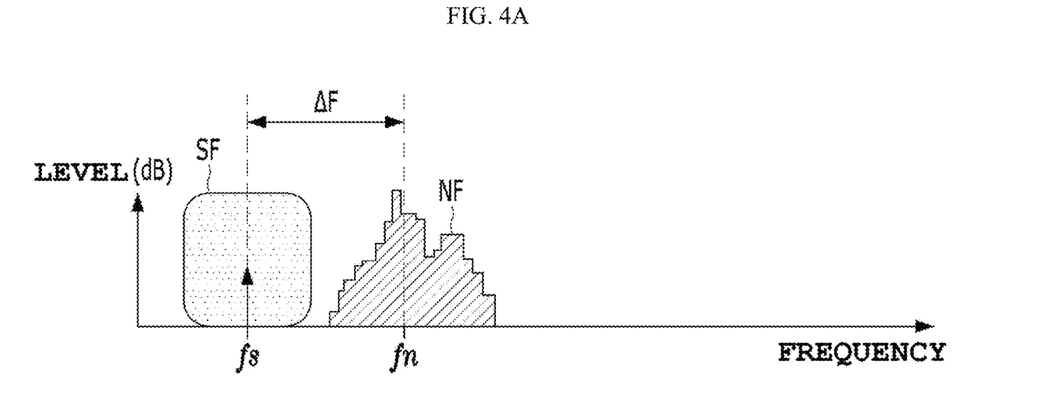
FIGS. 4A and 4B are exemplary waveform diagrams for explaining a method whereby a booster controller performs step 330.
Figure 4B:
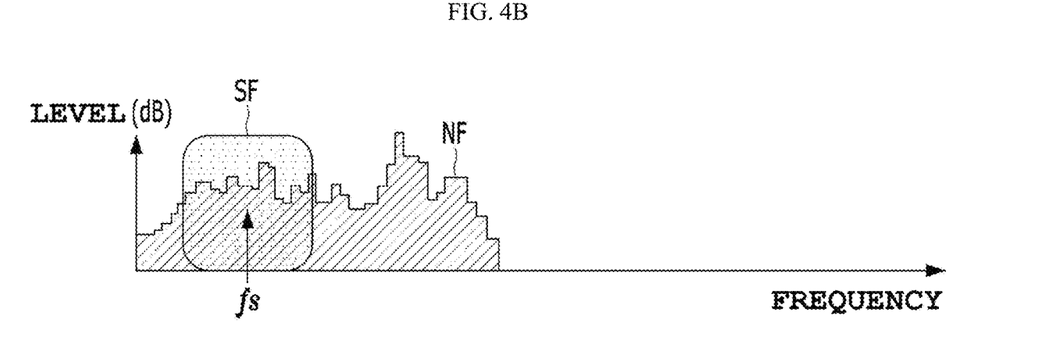

FIGS. 4A and 4B are exemplary waveform diagrams for explaining a method whereby the booster controller 217 performs step 330. In each graph, the horizontal axis represents a frequency, and the vertical axis represents a level.

According to one embodiment, in order to perform step 330, the booster controller 217 may check whether a difference $\Delta F$ between the center frequency fn of the noise frequency band NF of the generated noise and the switching frequency fs is greater than a first predetermined value. As shown in FIG. 4A, if the difference $\Delta F$ is greater than the first predetermined value, the booster controller 217 may determine that the sensitivity to a wireless signal is not outside of the allowable range. The reason for this is that, when the switching operation necessary to generate the booster voltage is performed at the switching frequency fs, if the difference ΔF is sufficiently large, as shown in FIG. 4A, noise is not generated in the voltage booster 211.

According to another embodiment, in order to perform step 330, the booster controller 217 may check whether the range within which the switching frequency band SF having the switching frequency fs as a center frequency and the noise frequency band NF of the generated noise overlap each other exceeds a second predetermined range. If the overlapping range exceeds the second predetermined range, the booster controller 217 may determine that the sensitivity to a wireless signal is outside of the allowable range. The reason for this is that, when the switching operation necessary to generate the booster voltage is performed at the switching frequency fs, if the overlapping range exceeds the second predetermined range, as shown in FIG. 4B, the sensitivity to a wireless signal is deteriorated beyond the allowable range by the noise generated in the voltage booster 211.

If the sensitivity to a wireless signal is outside of the allowable range, the booster controller 217 may adjust the switching frequency of the voltage booster 211, and may output the adjusted switching frequency to the voltage booster 211 (step 340).

However, if the sensitivity to a wireless signal is within the allowable range, the voltage booster 211 may determine a result obtained by increasing the magnitude of the supply voltage to be a booster voltage, and may output the booster voltage (step 350). For example, if it is determined that the sensitivity to a wireless signal is within the allowable range, the booster controller 217 may control the voltage booster 211 to output a booster voltage therefrom.

As described above, the level of noise generated from the voltage booster 211 may be determined depending on the switching frequency at which the voltage booster 211 is switched. In this case, the booster controller 217 may determine a switching frequency at which a great amount of noise is generated, whereby the sensitivity to a wireless signal falls below the allowable range, to be an "avoidance frequency". The reason for this is to inhibit the voltage booster 211 from being switched at the avoidance frequency. The configuration of the booster controller 217 for accomplishing this will be described below.

Figure 5:
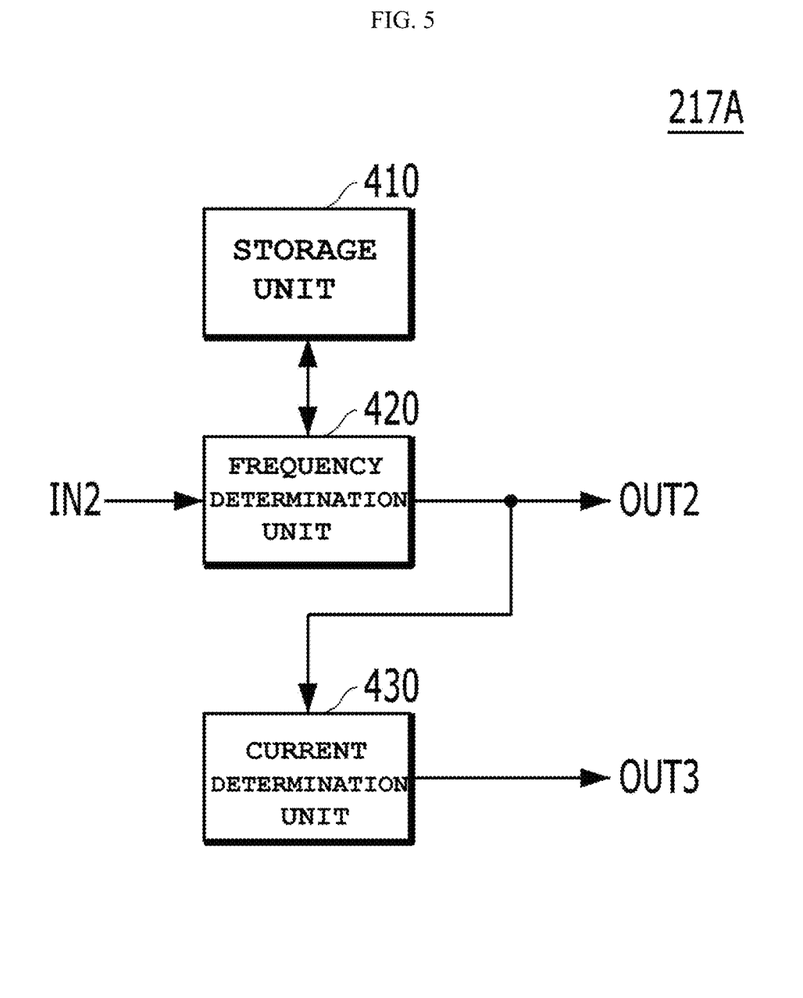
FIG. 5 is a block diagram of an embodiment of the booster controller shown in FIG. 2.

FIG. 5 is a block diagram of an embodiment 217A of the booster controller 217 shown in FIG. 2.

The booster controller 217A shown in FIG. 5 may include a storage unit 410 and a frequency determination unit 420.

The frequency determination unit 420 receives the level of noise detected by the noise detector 219 through an input terminal IN2, adjusts the switching frequency in response to the detected level of noise, and outputs the adjusted switching frequency to the voltage booster 211 through an output terminal OUT2. That is, the frequency determination unit 420 serves to perform steps 330 and 340.

The storage unit 410 stores a result of matching of the detected levels of noise with the switching frequencies. To this end, the frequency determination unit 420 may match the "detected levels of noise" provided through the input terminal IN2 with the "switching frequencies corresponding thereto", and may store a result of matching in the storage unit 410. For example, the storage unit 410 may be implemented in the form of a look-up table (LUT) in which the "switching frequencies" are stored as addresses and the "detected levels of noise" are stored as data.

The frequency determination unit 420 may determine a switching frequency matching a level of noise exceeding an allowable noise level, among the levels of noise stored in the storage unit 410, to be the avoidance frequency. Here, the allowable noise level may be a level of noise that does not deteriorate the sensitivity to a wireless signal beyond the allowable range.

Thereafter, the frequency determination unit 420 may not output the avoidance frequency to the voltage booster 211 as the switching frequency.

Meanwhile, when the switching frequency increases, the time taken to generate the booster voltage may decrease, and when the switching frequency decreases, the time taken to generate the booster voltage may increase. Accordingly, allowable current may be determined depending on an extent of adjustment of the switching frequency so that the booster voltage is determined (or finally generated) for a predetermined amount of time. Here, the allowable current may be the current that is allowed to flow through the voltage booster 211.

For example, in step 340, when the switching frequency increases, the peak value of the allowable current may decrease, and when the switching frequency decreases, the peak value of the allowable current may increase, with the result that the time taken to generate the booster voltage may become constant. To this end, the booster controller 217A may further include a current determination unit 430, as shown in FIG. 5. The current determination unit 430 may determine the intensity of the allowable current flowing through the voltage booster 211 in response to the extent of adjustment of the switching frequency by the frequency determination unit 420, and may output a control signal to the voltage booster 211 through an output terminal OUT3 so that the allowable current having the determined intensity flows through the voltage booster 211. Accordingly, the allowable current having the intensity determined by the current determination unit 430 shown in FIG. 2 may flow through the voltage booster 211. In some cases, the current determination unit 430 may be omitted.

Meanwhile, referring back to FIG. 2, the variable lens driving circuit 210A may further include a voltage stabilizer 213. The voltage stabilizer 213 serves to stabilize the booster voltage output from the voltage booster 211.

In addition, the variable lens driving circuit 210A may further include a switching unit 215. The switching unit 215 may serve to selectively supply the booster voltage output from the voltage booster 211 to the variable lens 220.

Figure 6:
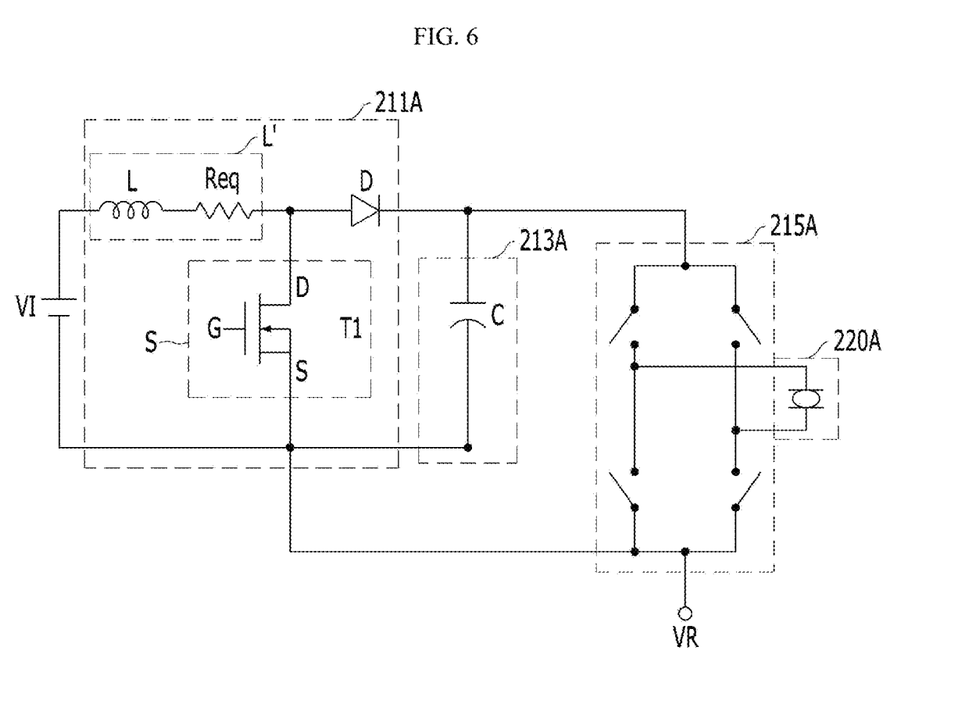
FIG. 6 is a circuit diagram of an embodiment of the variable lens driving device shown in FIG. 2.

FIG. 6 is a circuit diagram of an embodiment of the variable lens driving device 210A shown in FIG. 2. For convenience of description, illustration of the booster controller 217 and the noise detector 219 shown in FIG. 2 is omitted from FIG. 6.

The voltage booster 211A may include a switch S, an inductor L', and a diode D.

The switch S may perform a switching operation at the switching frequency provided by the booster controller 217, and may have one end connected to a reference potential VR (e.g. a ground). For example, the switch S may be implemented as a MOSFET T1. The MOSFET T1 may include a drain D, which is connected to a contact point between the inductor L' and the anode of the diode D, a source S, which is connected to the reference potential VR, and a gate G, which is connected to a switching signal. Here, the frequency of the switching signal corresponds to the aforementioned switching frequency. The MOSFET T1 having this configuration may perform a switching operation in response to the switching signal output from the booster controller 217.

The inductor L' may be disposed between a supply voltage VI and the other end of the switch S so as to be connected thereto, and may be expressed by an inductance L and an equivalent resistance Req. In this case, the above-described allowable current may be the current flowing through the inductor L'. When the switch S is switched at the switching frequency, noise may be generated in the inductor L'.

The diode D may have an anode connected to the other end of the switch S.

The booster voltage may correspond to a voltage applied across a cathode of the diode D and one end (i.e. the reference potential) of the switch S.

In addition, the voltage stabilizer 213A may be implemented as a capacitor C disposed between the cathode of the diode D and the reference potential VR and connected thereto. In addition, the switching unit 215A may include a plurality of switches. The switching unit 215 may include a circuit configuration commonly referred to as an H bridge. The booster voltage output from the voltage booster 211 is applied to the switching unit 215 as a power supply voltage. The switching unit 215 may selectively supply the booster voltage applied thereto and a ground voltage to the two ends of the variable lens 220. In this case, the variable lens driving signal for driving the variable lens 220 may have, for example, a pulse width modulation (PWM) form having peak values of ±70 volts. In this case, the effective value of the pulse, which is the variable lens driving signal, may be determined by drive code.

Hereinafter, the variable lens driving device and method according to the embodiments will be described in comparison with a comparative example with reference to the accompanying drawings. In the case of the variable lens driving device and method according to the comparative example, it is assumed that the switching frequency is fixed.

Figure 7:
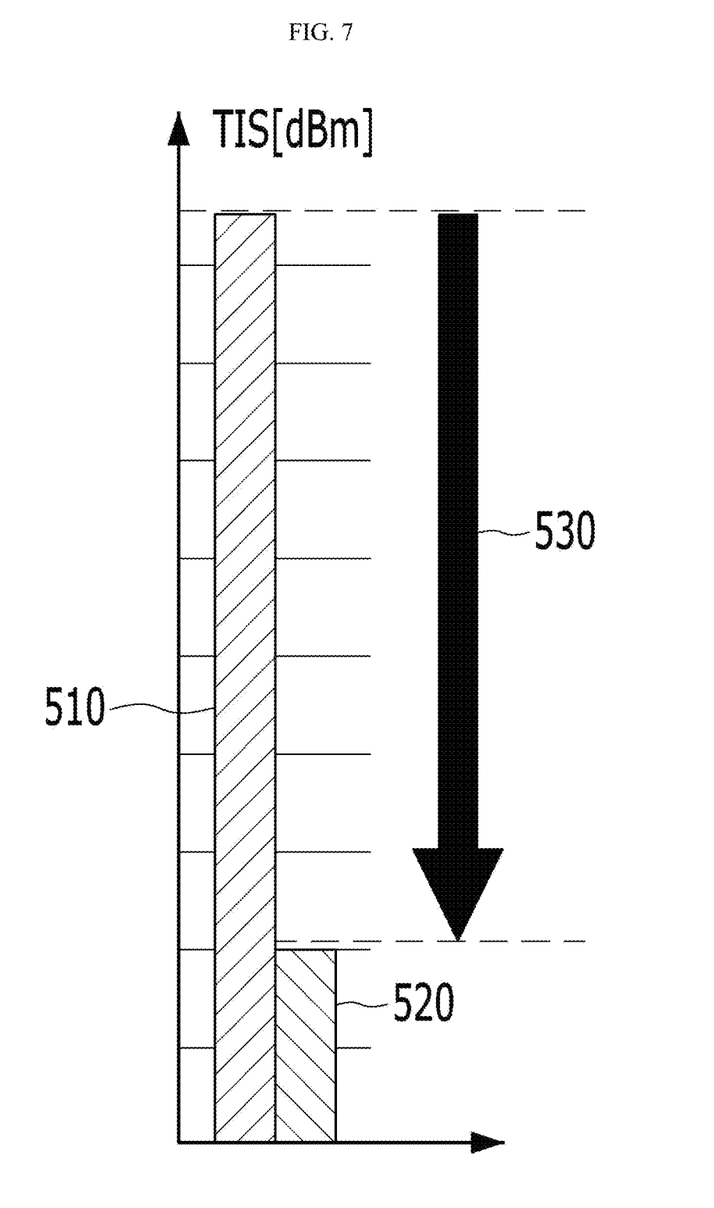
FIG. 7 is a diagram for explaining a change in sensitivity to a wireless signal due to noise.
Figure 8A:
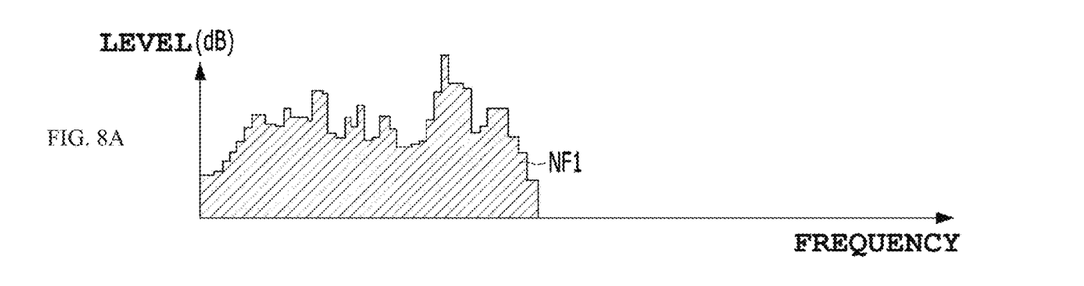
FIGS. 8A-8D illustrate various forms of a noise frequency band.
Figure 8B:
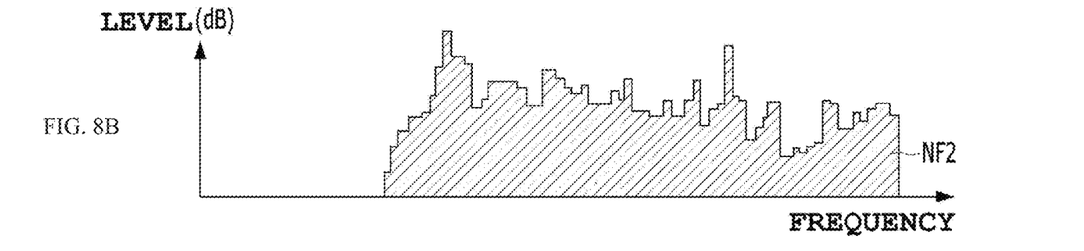
Figure 8C:
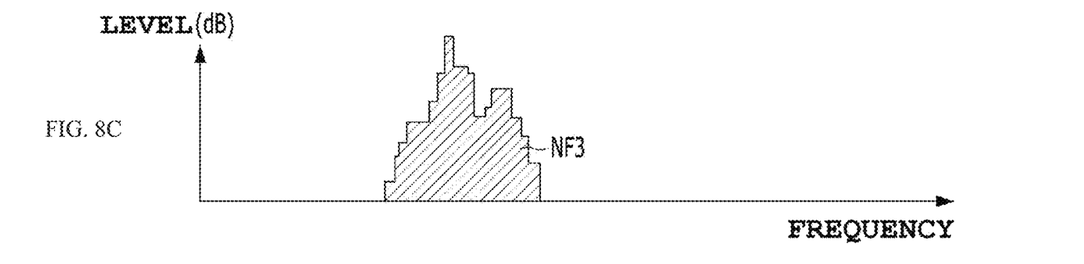
Figure 8D:
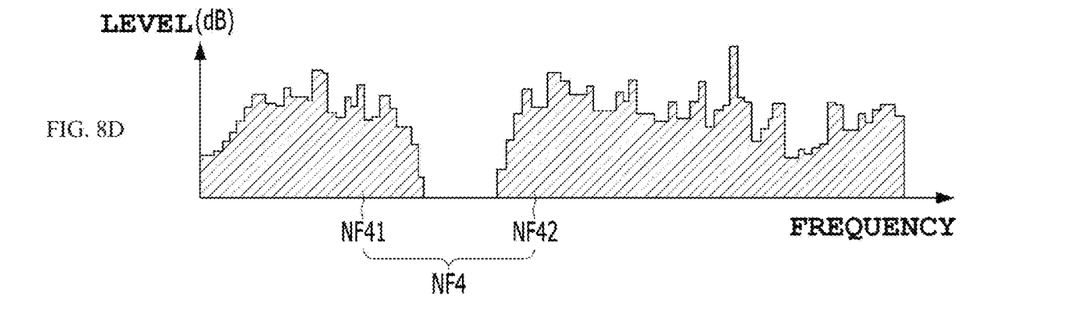

FIG. 7 is a diagram for explaining a change in sensitivity to a wireless signal due to noise, in which the vertical axis represents total isotropic sensitivity (TIS).

When the wireless communication device 100 shown in FIG. 1 does not include the camera module 200, or when the wireless communication device 100 includes the camera module 200 but the variable lens driving circuit 210 is not being operated, the sensitivity 510 to a wireless signal has the level shown in FIG. 7.

In this case, when the variable lens driving circuit 210 included in the camera module 200 of the wireless communication device 100 operates, the sensitivity 520 to a wireless signal may be deteriorated by a certain level 530 by radiation noise generated by the switching operation of the voltage booster 211 or 211A. In the case of the variable lens driving device and method according to the comparative example in which the switching frequency is fixed, there are limitations on the positions at which a variable lens can be located in a wireless communication device in order to inhibit deterioration in the sensitivity 520 to a wireless signal due to noise from exceeding an allowable range, and it is difficult to apply a variable lens driving device configured to generate a booster voltage in a switching manner to a wireless communication device having a narrow bezel.

FIGS. 8A-8D illustrate various forms of a noise frequency band. In each graph, the horizontal axis represents a frequency, and the vertical axis represents the level of noise generated in the voltage booster 211.

The frequency band of noise generated in the voltage booster 211 may have various forms, as shown in FIGS. 8A-8D, depending on the switching frequency at which the switch S of the voltage booster 211 is switched. That is, when the switch S of the voltage booster 211 is switched at a first switching frequency fs1, the noise frequency band NF1 has the form shown in FIG. 8A. In addition, when the switch S of the voltage booster 211 is switched at a second switching frequency fs2, the noise frequency band NF2 has the form shown in FIG. 8B. In addition, when the switch S of the voltage booster 211 is switched at a third switching frequency fs3, the noise frequency band NF3 has the form shown in FIG. 8C. In addition, when the switch S of the voltage booster 211 is switched at a fourth switching frequency fs4, the noise frequency band NF4 (NF41 and NF42) has the form shown in FIG. 8D. In this way, as the switching frequency is changed, the noise frequency band may be shifted to various positions.

In order to solve the problems with the variable lens driving device and method according to the above-described comparative example, according to the variable lens driving device and method according to the embodiments, the switching frequency is varied in order to find the optimum switching frequency at which deterioration in the sensitivity to a wireless signal is minimized, and the switch S of the voltage booster 211 is switched at the found switching frequency. That is, the variable lens driving device and method according to the embodiments minimize reduction in the sensitivity to a wireless signal by adjusting the density of noise while varying the switching frequency at which the switch S of the voltage booster 211 is switched. Therefore, unlike the comparative example, it may be possible to minimize deterioration in the sensitivity to a wireless signal due to noise generated by the switching operation of the switch S of the voltage booster 211.

Figure 9A:
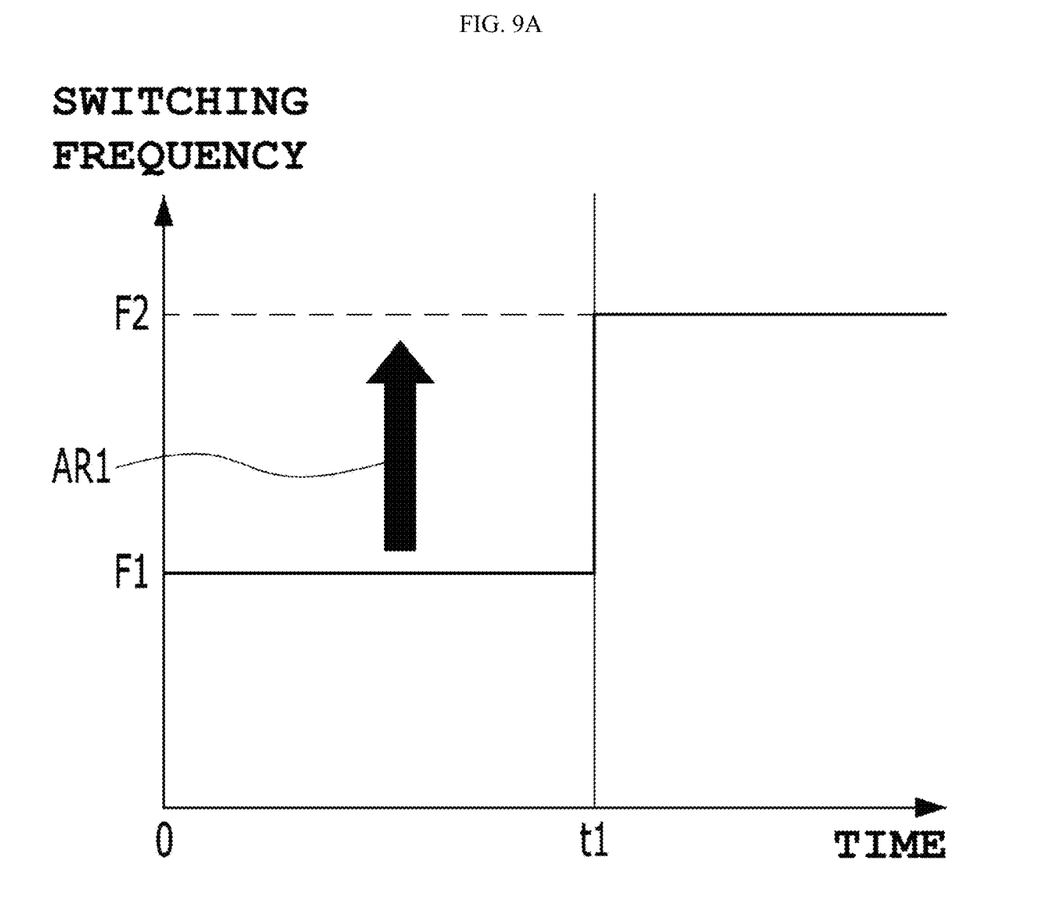
FIGS. 9A and 9B are graphs for explaining a change in allowable current flowing through an inductor in response to adjustment of a switching frequency.
Figure 9B:
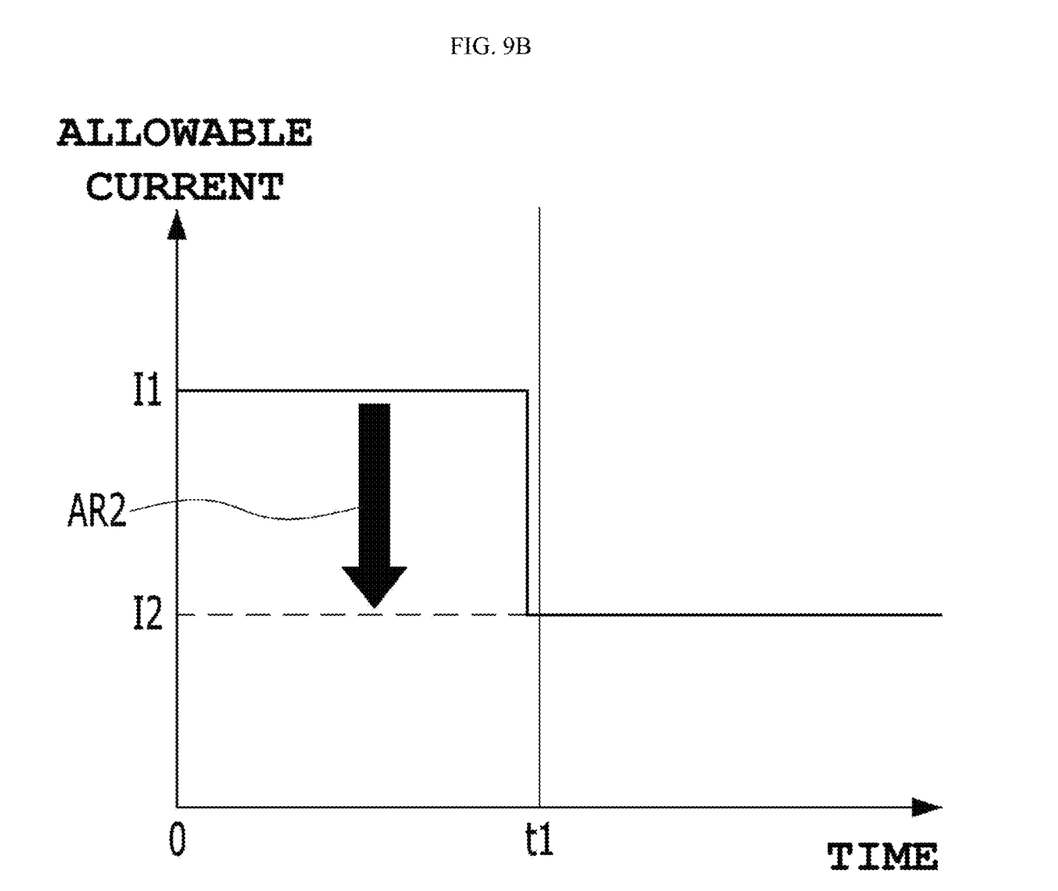

FIGS. 9A and 9B are graphs for explaining a change in allowable current flowing through the inductor L' in response to adjustment of the switching frequency.

When the switching frequency increases in the direction of the arrow AR1 from a first frequency F1 to a second frequency F2 in step 340, i.e. at a time point t1, as shown in FIG. 9A, and when the peak value of the allowable current decreases in the direction of the arrow AR2 from a first magnitude I1 to a second magnitude I2 at the time point t1, as shown in FIG. 9B, the time taken to generate the booster voltage may be constant even upon changes in the switching frequency.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

MODE FOR INVENTION

Various embodiments have been described in the best mode for carrying out the disclosure.

INDUSTRIAL APPLICABILITY

A variable lens driving circuit, a communication device including the same, and a method of driving a variable lens according to embodiments may be used in portable devices, such as smartphones, laptop computers, and tablet computers.

The invention claimed is:

1. A variable lens driving circuit that transmits and receives a wireless signal with a communication unit, comprising:
   a voltage booster configured to perform a switching operation corresponding to a switching frequency to increase a magnitude of a supply voltage;
   a noise detector configured to sense sensitivity to the wireless signal and detect a level of noise generated by the switching operation of the voltage booster, using the result of sensing; and
   a booster controller configured to adjust the switching frequency of the voltage booster in response to the detected level of noise.

2. The variable lens driving circuit according to claim 1, wherein the booster controller controls the voltage booster in response to the detected level of noise to output a result obtained by increasing the magnitude of the supply voltage as a booster voltage.

3. A wireless communication device, comprising:
   the variable lens driving circuit described in claim 2;
   a variable lens configured to be driven in response to a variable lens driving voltage generated in the variable lens driving circuit using the booster voltage; and
   a communication unit configured to transmit and receive a wireless signal.

4. The wireless communication device according to claim 3, wherein the communication unit 120 is disposed adjacent to the variable lens driving circuit.

5. The wireless communication device according to claim 3, further comprising an optical device, the optical device including a camera module, and
   wherein the camera module includes the variable lens driving circuit and the variable lens.

6. The wireless communication device according to claim 3, wherein the noise detector senses sensitivity to the wireless signal transmitted from or received by the communication unit, and detects a level of the noise using the result of sensing.

7. The wireless communication device according to claim 6, wherein the wireless signal sensed by the noise detector is a wireless signal received by the communication unit.

8. The variable lens driving circuit according to claim 2, further comprising a switching unit selectively supplying the booster voltage output from the voltage booster.

9. The variable lens driving circuit according to claim 1, wherein the booster controller comprises:
   a storage unit configured to store a result of matching of detected levels of noise with switching frequencies; and
   a frequency determination unit configured to determine a switching frequency matching a level of noise exceeding an allowable noise level, among the stored levels of noise, to be an avoidance frequency.

10. The variable lens driving circuit according to claim 9, wherein the storage unit includes a look-up table (LUT) in which the switching frequencies are stored as addresses and the detected levels of noise are stored as data.

11. The variable lens driving circuit according to claim 1, wherein the booster controller comprises:
    a current determination unit configured to determine an intensity of an allowable current flowing through the voltage booster in response to an extent of adjustment of the switching frequency.

12. The variable lens driving circuit according to claim 11, wherein the booster controller determines the intensity of the allowable current depending on a predetermined amount of time taken to generate the booster voltage.

13. The variable lens driving circuit according to claim 11, wherein the voltage booster comprises:
    a switch configured to perform a switching operation at the switching frequency, the switch having one end connected to a reference potential;
    an inductor connected to the supply voltage and to an opposite end of the switch and disposed therebetween; and
    a diode having an anode connected to the opposite end of the switch, and
    wherein the booster voltage corresponds to a voltage applied across a cathode of the diode and the one end of the switch.

14. A variable lens driving method, comprising:
    performing a switching operation corresponding to a switching frequency to increase a magnitude of a supply voltage;
    sensing sensitivity to a wireless signal and detecting a level of noise generated by the switching operation using the result of sensing;
    determining whether sensitivity to a wireless signal is outside of an allowable range using the detected level of noise; and
    adjusting the switching frequency when the sensitivity to a wireless signal is outside of the allowable range.

15. The variable lens driving method according to claim 14, comprising:
    determining a result obtained by increasing the magnitude of the supply voltage to be a booster voltage when the sensitivity to a wireless signal is within the allowable range.

16. The variable lens driving method according to claim 14, wherein the determining whether the sensitivity to a wireless signal is outside of the allowable range comprises:
    determining whether a difference between a center frequency of a noise frequency band of the generated noise and the switching frequency is greater than a first predetermined value.

17. The variable lens driving method according to claim 14, wherein the determining whether the sensitivity to the wireless signal is outside of the allowable range includes determining whether a range within which a switching frequency band having the switching frequency as a center frequency and a noise frequency band occupied by the generated noise overlap each other exceeds a second predetermined range.

18. The variable lens driving method according to claim 14, wherein an intensity of an allowable current flowing through a voltage booster, which increases a magnitude of the supply voltage, is determined depending on an extent of adjustment of the switching frequency.

19. The variable lens driving method according to claim 18, comprising:
    reducing a peak value of the allowable current when the switching frequency is increased; and
    increasing the peak value of the allowable current when the switching frequency is reduced.

* * * * *